May 1, 1934.　　　J. D. HUNTSBERGER　　　1,957,342
BATTERY ASSEMBLY

Filed Nov. 5, 1930

Inventor:
John D. Huntsberger
by his Attorneys
Howson & Howson

Patented May 1, 1934

1,957,342

UNITED STATES PATENT OFFICE 1,957,342

BATTERY ASSEMBLY

John D. Huntsberger, Philadelphia, Pa., assignor to Philadelphia Storage Battery Company, Philadelphia, Pa., a corporation of Pennsylvania Application November 5, 1930, Serial No. 493,604

4 Claims. (Cl. 136—81)

This invention relates to improvements in storage batteries, and the principal object of the invention is to provide novel, simple and effective means for obtaining a snug and secure assembly of the battery elements in the container.

More particularly, the invention has for an object the provision of such means applicable to batteries employing containers of glass, although the invention is applicable to storage batteries in general regardless of the materials of which the containers may be made.

Another object of this invention is to provide improved means for substantially immobilizing the battery element assembly with respect to the battery container at all times, and for preventing displacement of the elements due to expansion, contraction or warping of the plates.

The above objects are attained according to the present invention by means of a novel combination side wedge and corner lock member, which reacts with the side walls of the battery container to maintain itself in proper position, and which is adapted to embrace a corner of the battery element assembly to firmly hold the same. Four of such members may be used, one at each corner of the battery element assembly.

Figure 1:
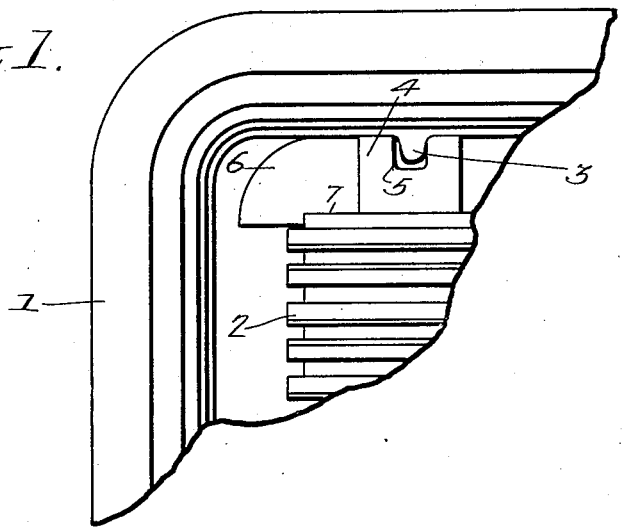
Figure 2:
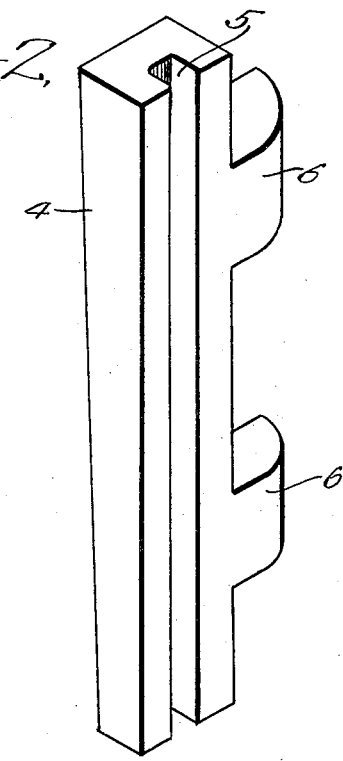
Figure 3:
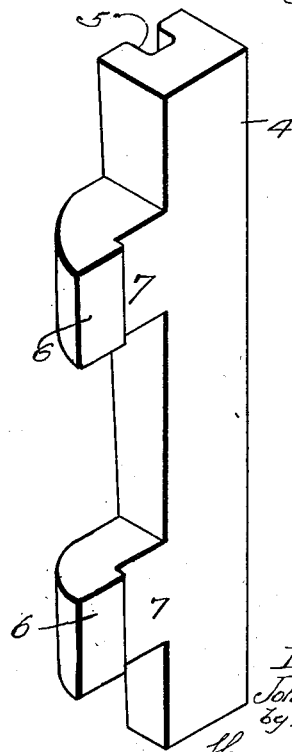

In the accompanying drawing:

Fig. 1 is a partial plan view of the battery with certain parts removed in order to clarify the illustration; and Figs. 2 and 3 are views in perspective of the combination side wedge and corner lock member of the invention.

Referring to the drawing, 1 is a battery jar or container of glass or other suitable material. The walls of this container may taper slightly toward the bottom in accordance with the requirements of the molding operation by which containers of this class are customarily formed. The battery element assembly is designated generally by reference character 2. As is well known in the art, this assembly is made up of the positive and negative plates and their separators. In the present instance, these elements are assembled and disposed within the battery container in the usual manner practiced in the art. The battery elements are generally supported at the bottom upon supporting elements and at the top through the medium of straps which respectively connect the plates of opposite polarity, and to which are connected the terminal posts which project upwardly through and are secured in the battery cover. Since this is conventional construction, it is deemed unnecessary for the purpose of the present invention to disclose the same in detail. The cover of the battery in the present instance is also of the usual type, being provided with the usual vent and filler openings.

In accordance with the present invention, the side walls of container 1 are provided with elongated, vertical projections 3, the purpose of which will be apparent hereinafter. These projections are preferably made an integral part of the container, and are formed during the molding operation by which the container is formed. Four such projections, two on each of the opposite side walls of the container, are provided. Although, a corner only of the battery is disclosed in the present instance for the purpose of illustrating my invention, it will be understood that the other three corners are of identical construction.

In further accordance with the present invention, I provide a combination side wedge and corner lock member 4, the shape and construction of which is shown clearly in Figs. 2 and 3. As shown in those figures, one side of the wedge member may be tapered towards the bottom in order to conform with the form of container 1. Since the container is wider at the top than at the bottom, the wedge members are accordingly made to have the same taper. The tapered side of each of these members is provided with an elongated groove 5. As illustrated in Fig. 1, when the wedge members are in place between the battery element assembly and the container, the projections 3 on the side walls of the container are adapted to fit into the grooves on the wedge members. The projections and grooves are made so that they do not conform exactly with each other for a purpose to be described later.

A plurality of extending portions 6 are provided on each of the wedge members, such extensions being formed to provide recesses 7 which are adapted to snugly receive the corners of the battery assembly. Wedge members 4 may be made of any suitable insulating material, such as wood, bakelite or rubber composition.

In assembling a battery which incorporates my invention, the battery element assembly 2 may first be inserted in the container in the usual manner. Thereafter, the wedge members are inserted one in each corner of the battery, as shown in Fig. 1. It is well known in the art that the plates of a storage battery are apt to vary in size, and are also apt to expand and contract and buckle during the use of the battery. The novelly constructed wedge member of my invention compensates for variation in the length of the plates at all times. It will be noted that the wedge members completely engage the ends of the outside element or plate of the battery assembly. If the length of this plate varies, the wedge member compensates for such variation due to a sort of pivoting action of the member about projection 3 on the wall of the container. The wedge member frictionally engages the container on each side of the projection, but the frictional engagement may be greater or less on each side of the projection in accordance with the length of the battery plate. It is to obtain this slight pivoting action that projections 3 and grooves 5 are made so that they do not conform exactly with each other. Furthermore, the material of which the wedge member is made will enable a slight resiliency of the same. Although, the above-described pivoting action is present, it will be understood that the projections 3 at all times maintain the wedge members in proper position with respect to the container.

The projections 6 may be formed to fit in the corners of the container, in which case the ribs 3 need not necessarily be used. It is important to note also that wedge members 4 will prevent buckling of the plates if such members are sufficiently wide to contact a substantial portion of the outer face of each outside element or plate.

It will be apparent that wedge members provided in accordance with the present invention snugly secure the battery element assembly within the battery container and, at the same time, compensate for any variation in size of the battery plates. A battery construction of simple and efficient design is obtained by means of my invention. It will be apparent, of course, that changes in the construction thereof may be made, and the invention is to be limited only by the scope of the appended claims.

I claim:

1. A battery comprising a jar, battery plates and separators mounted within the jar, and members engaging the corners of the battery plate and separator assembly and shaped to receive the same, the walls of said jar and said members having substantially vertically disposed interlocking means for fixing said members horizontally in predetermined position, whereby said assembly is substantially immobilized with respect to said jar and said plates and separators are bound together.

2. A battery comprising a jar, battery plates and separators mounted within the jar, and wedge members engaging the corners of the battery plate and separator assembly and shaped to receive the same, the walls of said jar and said members having substantially vertically disposed interlocking means for fixing said members horizontally in predetermined position, whereby said assembly is substantially immobilized with respect to said jar and said plates and separators are bound together.

3. A battery comprising a jar, battery plates and separators mounted within the jar, and wedge members engaging the corners of the battery plate and separator assembly and shaped to receive the same, the walls of said jar and said members having co-acting vertically extending projections and recesses for fixing said members horizontally in predetermined position, whereby said assembly is substantially immobilized with respect to said jar and said plates and separators are bound together.

4. A battery comprising a jar, battery plates and separators mounted within the jar, and wedge members engaging the corners of the battery plate and separator assembly and shaped to receive the same, the walls of said jar and said members having co-acting vertically extending ribs and grooves for fixing said members horizontally in predetermined position, whereby said assembly is substantially immobilized with respect to said jar and said plates and separators are bound together.

JOHN D. HUNTSBERGER.